(12) United States Patent
McClurg

(10) Patent No.: US 12,542,800 B2
(45) Date of Patent: Feb. 3, 2026

(54) MALICIOUS DOMAIN MONITORING AND FILTERING USING DRIFT MONITORING AND CONTEXTUAL DATA

(71) Applicant: Google LLC, Mountain View, CA (US)

(72) Inventor: Jerry McClurg, Savannah, TX (US)

(73) Assignee: GOOGLE LLC, Mountain View, CA (US)

( * ) Notice: Subject to any disclaimer, the term of this patent is extended or adjusted under 35 U.S.C. 154(b) by 252 days.

(21) Appl. No.: 18/360,421

(22) Filed: Jul. 27, 2023

(65) Prior Publication Data

US 2025/0039218 A1 Jan. 30, 2025

(51) Int. Cl.
*H04L 9/40* (2022.01)

(52) U.S. Cl.
CPC ...... *H04L 63/1433* (2013.01); *H04L 63/1441* (2013.01)

(58) Field of Classification Search
CPC ............. H04L 63/1433; H04L 63/1441; H04L 63/1483
See application file for complete search history.

(56) References Cited

U.S. PATENT DOCUMENTS

| 8,510,411 | B2 | 8/2013 | Coulson et al. | |
|---|---|---|---|---|
| 8,776,224 | B2 | 7/2014 | Krishnamurthy et al. | |
| 9,558,497 | B2 | 1/2017 | Carvalho | |
| 10,491,614 | B2 * | 11/2019 | Grill | H04L 63/1441 |
| 10,911,477 | B1 * | 2/2021 | Kharraz | H04L 63/1441 |
| 11,301,560 | B2 | 4/2022 | Prakash et al. | |
| 11,587,080 | B2 | 2/2023 | Wardman et al. | |
| 11,588,826 | B1 * | 2/2023 | Lin | H04L 63/1416 |
| 2006/0068755 | A1 * | 3/2006 | Shraim | H04L 63/1441 455/410 |
| 2018/0351972 | A1 * | 12/2018 | Yu | H04L 63/1441 |
| 2020/0382533 | A1 * | 12/2020 | Nabeel | H04L 63/1425 |
| 2022/0124106 | A1 * | 4/2022 | Chiu | H04L 63/1441 |

(Continued)

OTHER PUBLICATIONS

International Search Report and Written Opinion for Application No. PCT/US2024/039845, mailed Nov. 19, 2024, 14 pages.

(Continued)

*Primary Examiner* — Nam T Tran
(74) *Attorney, Agent, or Firm* — DORITY & MANNING, P.A.

(57) ABSTRACT

Example embodiments of the present disclosure provide for an example method including generating a baseline set of domains by comparing domains of interest to a group of existing registered domains. The domains of interest are generated using a permutation engine based on a first domain. The example method includes periodically generating a dynamic set of domains by comparing the domains of interest to an updated group of existing registered domains. The updated group is obtained in real-time. The example method includes determining a potentially malicious domain based on comparing the baseline set and dynamic set. The example method includes for each respective potentially malicious domain: obtaining an IP address associated with the potentially malicious domain and determining an IP address risk score. The example method includes determining a potentially malicious domain is a malicious domain based on the IP address risk score of the potentially malicious domain.

17 Claims, 6 Drawing Sheets

(56) References Cited

U.S. PATENT DOCUMENTS

2022/0279014 A1\* 9/2022 Stokes, III .......... H04L 63/1483
2023/0123157 A1\* 4/2023 Ramanan ............ H04L 63/1425
706/12

OTHER PUBLICATIONS

BolsterAI, "Intuitive Methodology for Typosquatted Domains", https://bolster.ai/solutions/typosquatting-protection, retrieved on Aug. 4, 2023, 8 pages.

\* cited by examiner

MALICIOUS DOMAIN MONITORING AND FILTERING USING DRIFT MONITORING AND CONTEXTUAL DATA

FIELD

The present disclosure relates generally to domain monitoring and filtering using drift monitoring and contextual data. Domain monitoring allows for detecting malicious domains to initiate takedown actions to prevent cyberattacks.

BACKGROUND

Malicious domains can be used to distribute malware or engage in other malicious activities. These types of domains can be used in cyberattacks to distribute malware, steal sensitive data, or launch attacks on other systems. Monitoring for registration of domains can include monitoring based on permutations of known domains and initiating takedown actions for the malicious domains.

SUMMARY

Aspects and advantages of embodiments of the present disclosure will be set forth in part in the following description, or can be learned from the description, or can be learned through practice of the embodiments.

In some aspects, the present disclosure provides for an example computer-implemented method for malicious domain monitoring and filtering using drift monitoring and contextual data. The example method includes generating a baseline set of domains by comparing a plurality of domains of interest to a group of existing registered domains. The domains of interest are generated using a permutation engine based on a first domain. The example method includes periodically generating a dynamic set of domains by comparing the plurality of domains of interest to an updated group of existing registered domains. The updated group of existing registered domains is obtained in real-time. The example method includes determining at least one potentially malicious domain based on comparing the baseline set and dynamic set. The example method includes for each respective potentially malicious domain: obtaining an IP address associated with the potentially malicious domain and determining a risk score for the respective potentially malicious domain. The method can include determining the risk score for the respective potentially malicious domain by: identifying one or more other different domains associated with the IP address; and determining an IP address risk score for the IP address based on data associated with the one or more other different domains associated with the IP address. The example method includes determining a first potentially malicious domain is a malicious domain based on the risk score of the first potentially malicious domain.

In some aspects, the present disclosure provides for an example computing system for malicious domain monitoring and filtering using drift monitoring and contextual data including one or more processors and one or more memory devices storing instructions that are executable to cause the one or more processors to perform operations. In some implementations the one or more memory devices can include one or more transitory or non-transitory computer-readable media storing instructions that are executable to cause the one or more processors to perform operations. In the example system, the operations can include obtaining a first domain. The operations can include generating, using a permutation engine, a plurality of domains of interests. The operations can include generating a baseline set of domains by comparing the plurality of domains of interest to a group of registered domains. The baseline set comprises at least a domain and an IP address. The operations can include periodically, generating a dynamic set of domains by comparing the plurality of domains of interest to an updated group of existing registered domains. The updated group of existing registered domains is obtained in real-time. The operations can include comparing, in response to generating the dynamic set of domains, the dynamic set to the baseline set to determine changes to at least one of the group of domains or an IP address for a domain being updated. As described herein, a group of existing registered domains can include a list of domains, a set of domain, or any data structure including data relating to the existing registered domains. The operations can include detecting, based on the comparison of the baseline set and the dynamic set, creation or deletion of one or more potentially malicious domains. The operations can include for each respective potentially malicious domain: obtaining the IP address associated with the potentially malicious domain; and determining a risk score for the respective potentially malicious domain. The operations can include determining a risk score for the respective potentially malicious domain by: identifying one or more other different domains associated with the IP address; and determining the IP address risk score for the IP address based on data associated with the one or more other different domains associated with the IP address. The operations can include determining a potentially malicious domain is a malicious domain based on the risk score.

In some aspects, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include generating a baseline set of domains by comparing a plurality of domains of interest to a group of existing registered domains. The domains of interest are generated using a permutation engine based on a first domain. In the example transitory or non-transitory computer readable medium, the operations include periodically generating a dynamic set of domains by comparing the plurality of domains of interest to an updated group of existing registered domains. The updated group of existing registered domains is obtained in real-time. In the example transitory or non-transitory computer readable medium, the operations include determining at least one potentially malicious domain based on comparing the baseline set and dynamic set. In the example transitory or non-transitory computer readable medium, the operations include for each respective potentially malicious domain: obtaining an IP address associated with the potentially malicious domain; and determining a risk score for the respective potentially malicious domain. In the example transitory or non-transitory computer readable medium, the operations include determining a risk score for the respective potentially malicious domain by: identifying one or more other different domains associated with the IP address; and determining an IP address risk score for the IP address based on data associated with the one or more other different domains associated with the IP address. In the example transitory or non-transitory computer readable medium, the operations include determining a first potentially malicious domain is a malicious domain based on the risk score of the first potentially malicious domain.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

The present disclosure relates to malicious domain monitoring and filtering using drift monitoring and contextual data. A malicious domain can be a domain that is used to distribute malware or engage in other malicious activities, such as command-and-control servers for botnets, or hosting malicious content. These types of domains are often used in cyberattacks, where the attacker will use the domain to distribute malware, steal sensitive data, or launch attacks on other systems. For purposes of this disclosure, a malicious domain can include a fraudulent domain. A fraudulent domain can be a type of domain that is created with the intent to deceive people into believing that they are interacting with a legitimate entity or organization, when in fact, the domain is controlled by a malicious actor. These types of domains are often used in phishing scams, where the attacker will send emails or messages to unsuspecting victims, directing them to a website that looks like it belongs to a legitimate company or organization. These are used by bad actors to trick the victim into divulging sensitive information, such as login credentials, credit card numbers, or personal information.

Existing systems detect potential malicious domains based on monitoring permutations of known domains. However, it is difficult to track the domains registered over time. Even if new domain registrations are detected, an additional problem is determining whether the registered domain is malicious. The present disclosure provides a solution to this problem by monitoring the drift, or changes, between a baseline domain set (e.g., table) and a dynamic domain set (e.g., table) over time to generate a group of newly added or changed domains. The solution can include determining a risk associated with the new domain using contextual data, such as enriched virus data (e.g., enriched VirusTotal data). The contextual data can allow for a more holistic consideration of circumstantial data associated with the domain's registered IP address. Contextual data can include data associated with a risk level of a domain or a domain's registered IP address. The risk level for a domain's registered IP address can be based on respective risk levels of other different domains registered to the IP address.

Existing methods look at a distance between a potentially malicious domain and a known valid domain to determine a risk level associated with the potentially malicious domain. However, existing methods fail to adequately filter out false positives or properly determine a risk associated with a potentially malicious domain. The present disclosure provides for a solution to this problem by assessing an IP address associated with a potentially malicious domain by considering risk data associated with other different domains associated with that IP address. This improves upon existing domain monitoring to result in quicker takedowns of malicious domains before they can be weaponized by bad actors.

Figure 1:
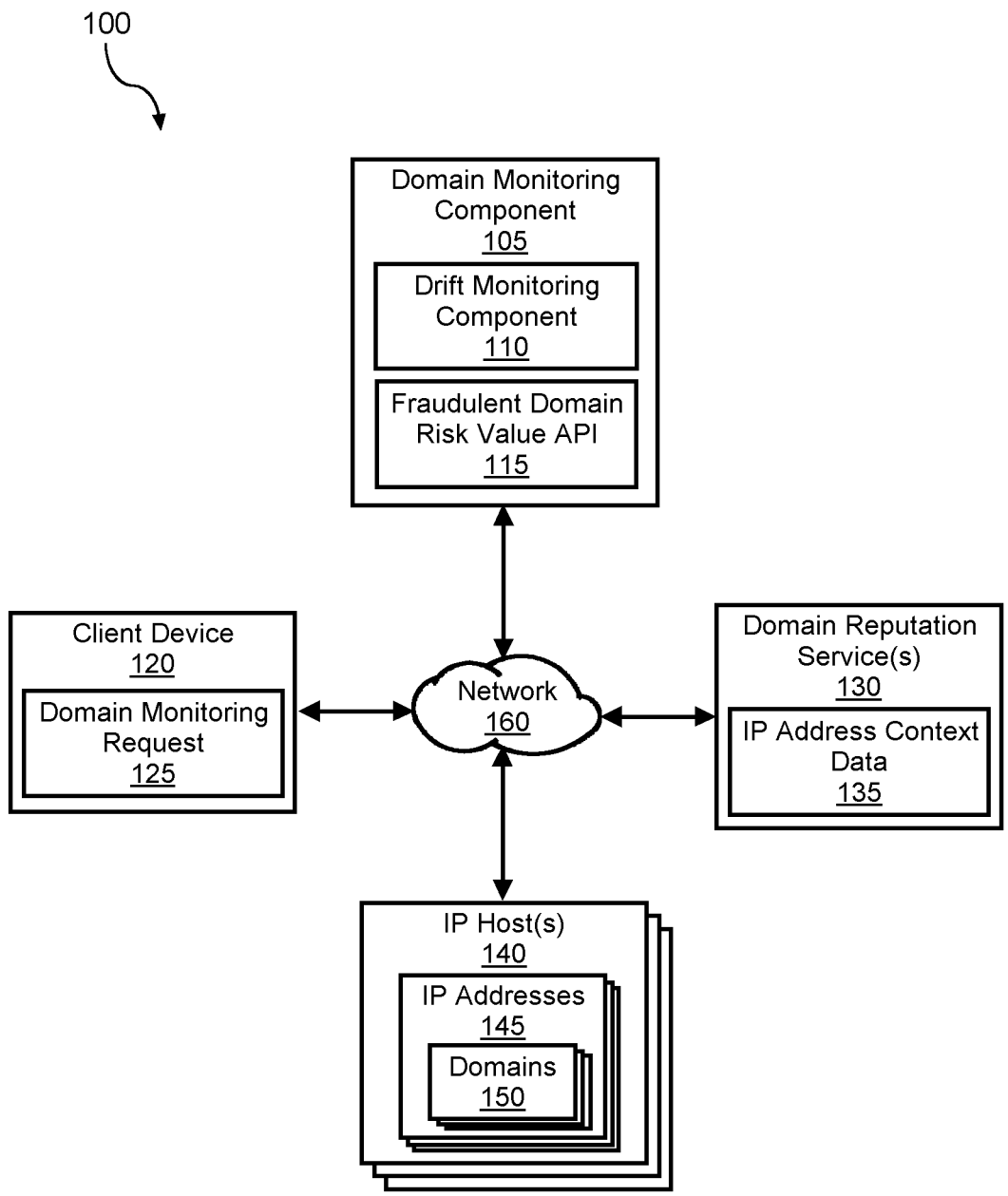
FIG. 1 depicts an example block diagram for malicious domain monitoring and filtering using drift monitoring and contextual data.

FIG. 1 depicts an example system architecture 100 for monitoring malicious domains utilizing drift monitoring according to embodiments of the present disclosure. For instance, system architecture 100 can include a domain monitoring component 105. The domain monitoring component 105 can receive a request to monitor a domain. The request can be automatically generated by a computing device or system associated with system architecture 100. In some implementations, the request can be transmitted by a client device. A domain can include a group of connected computing devices that share user account information and a security policy. A domain can include domain names. Domain names can include a unique identifier for an Internet site or Internet Protocol (IP) network address. The network address can include multiple segments separated by periods. For purposes of this disclosure, domain and domain name are used interchangeably.

Domain monitoring component 105 can receive a domain monitoring request 125 from a client device 120 including a domain to monitor. Domain monitoring component 105 can be communicatively coupled to client device 120, domain reputation services 130, or IP Hosts 140 over network 160. Domain monitoring component 105 can include drift monitoring component 110 and fraudulent domain risk value application programming interface (API) 115. Domain monitoring component 105 can obtain data associated with domain monitoring request 125. Domain monitoring request 125 can include a domain name or URL associated with an entity requesting domain monitoring. Responsive to obtaining the data associated with the domain monitoring request 125, drift monitoring component 110 can generate a baseline set. The baseline set can include related domains that are registered to IP addresses at the time that the domain monitoring request 125 is received. The drift monitoring component can periodically generate a dynamic set. The dynamic set can be an updated set (e.g., table) including related domains with registered IP addresses to compare to the baseline set. Related domains can include permutations of the initial domain. These permutations will be discussed further with regard to FIG. 2. The drift monitoring component 110 can be configured to determine differences between the dynamic set and the baseline set to determine potentially malicious domains. In some instances, the baseline set can be a table or other data structure.

The present disclosure provides for example graphical depictions of the baseline set and dynamic set for illustrative purposes. It should be understood that mentions of the respective tables are meant to encompass data structures including the information described for the tables. For instance, a baseline set including domain names and associated data can include a data structure (e.g., a matrix) that includes data that can be read by a computing system to be compared to an updated dynamic set or to be provided for display via a user interface of client device 120. In some instances, the dynamic set can be a table or other data structure.

The baseline and updated tables can be generated based on a comparison of the permutation of the initial domain and data obtained from IP Hosts 140. For instance, IP Hosts 140 can be associated with IP addresses 145 and domains 150. The baseline set can include a number of characteristics associated with domains 150 including the respective IP address they are associated with, the respective IP Hosts they are associated with, and other relevant data. Domains can be continually created or can update registration to various IP addresses. The present disclosure allows for quick detection of newly registered domains or newly created domains and assessment of a risk value associated with the respective domains.

The fraudulent domain risk value API 115 can enhance the data associated with the potentially fraudulent domains. For instance, the fraudulent domain risk value API 115 can communicate with domain reputation services 130 to obtain IP address context data 135. The IP address context data 135 can be utilized by fraudulent domain risk value API 115 to enrich the data associated with the potentially fraudulent domains and determine when a remedial action, such as a domain takedown, should be performed.

Figure 2:
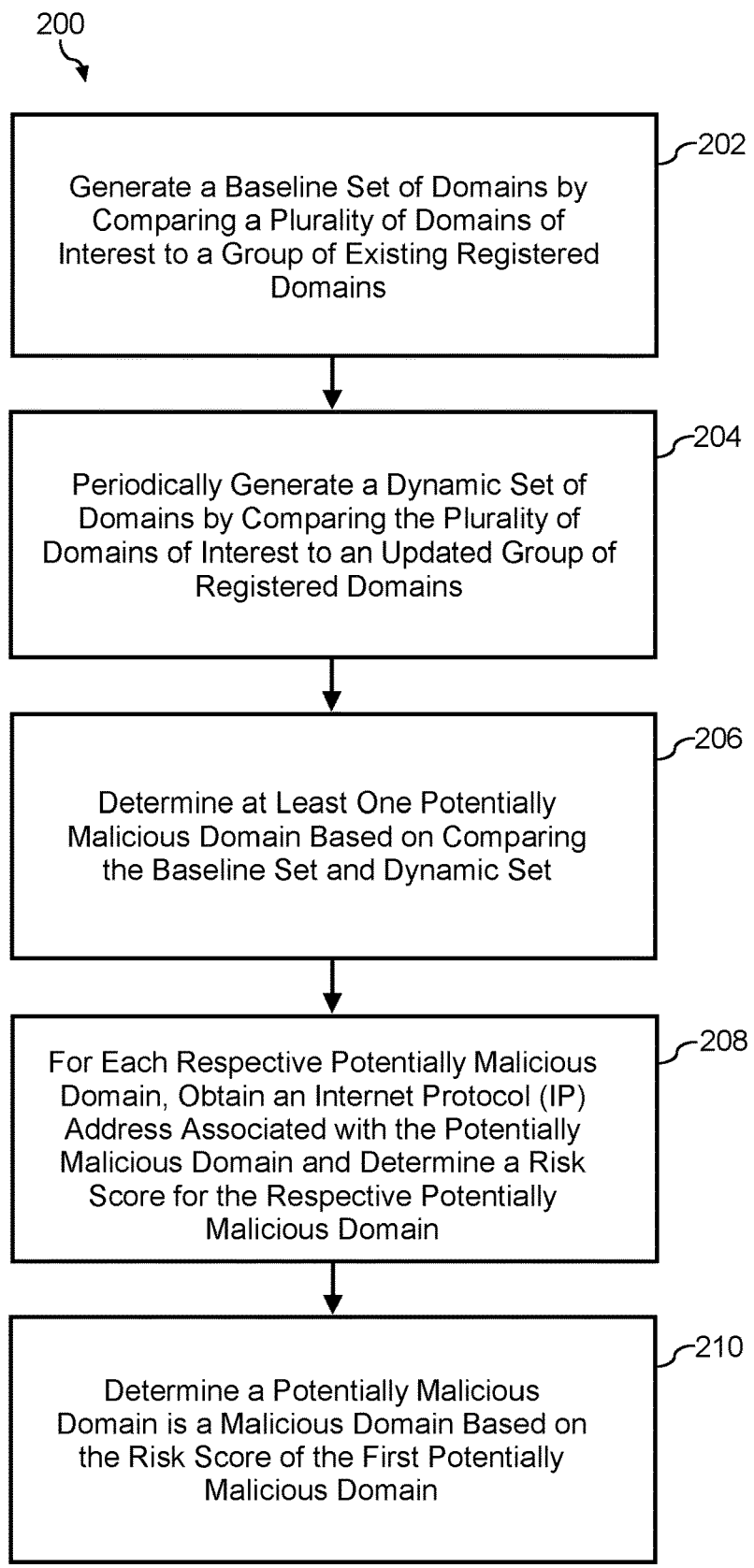
FIG. 2 depicts an example method for malicious domain monitoring and filtering using drift monitoring and contextual data.

FIG. 2 is a flow diagram of an example method 200 to perform malicious domain monitoring and filtering in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the domain monitoring component 105. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processors can be omitted in various embodiments. Thus, not all processes are required in every embodiment. Other process flows are possible.

At operation 202, processing logic generates a baseline set of domains by comparing a number of domains of interest to a group of existing registered domains. The domains of interest are generated using a permutation engine based on an initial domain. As described herein, processing logic can obtain an initial domain. The initial domain can include, for example, a uniform resource locator (URL). The initial domain can be obtained and used as input into a permutation engine. The permutation engine can generate domains of interest. For instance, generating the number of domains of interest can include determining a number of permutations of the original domain. Permutations of the initial domain are discussed in further detail with regard to FIG. 3.

In some implementations, the processing logic can generate a baseline set of domains by comparing the domains of interest to a group of registered domains. The baseline set can include at least one domain and an IP address. The baseline set can be generated by comparing the permutations of the original domain to WHOIS registered domains. Thus, the baseline set can be a table including the registered permutations or domains associated with keywords that are marked for review based on a keyword WHOIS sweep. The keyword WHOIS sweep can include querying websites or URLs associated with the list of domains for keywords associated with the initial domain to determine any registered domains that are similar to the initial domain.

The baseline set represents the known footprint of permutations and keyword sweeps of the initial domain at the time the request for monitoring is received. The baseline set can be used to determine deviations from the baseline set compared to a periodically generated dynamic set, as discussed herein.

Additionally, or alternatively, the baseline set can be regenerated. For instance, a baseline set can be regularly updated such as once a month, every two weeks, or some other frequency. The timing of updating of the baseline can occur based on the type of domain being monitored and the frequency of expected attacks. For instance, an airline can receive multiple malicious domain spin-ups on a daily or weekly basis. As such, a baseline set of the known state of registered permutations will be less useful a month out compared to the day after the baseline set is generated. By re-baselining for some domains, noise can be reduced to improve the accuracy of the spin-up and takedown measurements that will be discussed further within.

At operation 204, processing logic can periodically generate a dynamic set of domains by comparing the domains of interest to an updated group of registered domains. The updated group of existing registered domains can be obtained in real-time. As described herein, real-time is to be understood as meaning real-time or near real-time. Real-time can mean, for instance, that the input data is processed within milliseconds so as to be available virtually immediately as feedback. In some instances, near real-time can mean that the data or information has been delayed by the time required for electronic communication and automatic data processing, and thus has not had a significant delay.

As described herein, a dynamic set of domains can be generated periodically and compared to the baseline set. The dynamic set can be generated in a similar manner to the generation of the baseline set. For instance, the domain monitoring system can compare the permutations of the initial domain to an updated WHOIS registration list. The WHOIS registration list data can be periodically obtained and compared to the domain permutation list to determine if there are any new registered permutations or registrations that are flagged by the keyword WHOIS sweep.

The dynamic set can be generated at regular or irregular intervals. As described herein, generating the dynamic set of domains can occur multiple times a day. For instance, the dynamic set can be generated at set increments of time such as every hour, every four hours, four times a day, six times a day, or any other frequency. In some instances, the generation of a dynamic set can be triggered by an external event. An external event can include the domain monitoring component obtaining an alert that a phishing attack or some other security attack has taken place relating to the initial domain.

At operation 206, the processing logic can determine at least one potentially malicious domain based on comparing the baseline set and dynamic set. As described herein, the processing logic can compare, in response to generating the dynamic set of domains, the dynamic set to the baseline set to determine changes to the group of domains or an IP address for a domain being updated. The method can include detecting, based on the comparison of the baseline set and the dynamic set, creation or deletion of potentially malicious domains.

For instance, comparing the baseline set and dynamic set can result in a determination that a new domain has been registered or that an existing domain has been registered to a new IP address. The comparison of the baseline set to the dynamic set can surface differences in not only domains that are flagged as newly registered, but also can determine when other data, such as IP address, is updated for a domain. Determining deviations between the baseline set and the dynamic set can be considered drift monitoring. Drift monitoring includes determining a "shift in the distribution of data." In some instances, processing logic can generate an additional set (e.g., data structure, table) that includes the potential malicious domains. This additional Set can be representative of spin-ups or takedowns of domains.

At operation 208, processing logic can, for each respective potentially malicious domain, obtain an IP address associated with the potentially malicious domain and determine a risk score for the respective potentially malicious domain. Determining the risk score for the respective potentially malicious domain can be performed by identifying other different domains associated with the IP address and determining an IP address risk score for the IP address based on data associated with the other different domains associated with the IP address. For instance, determining the risk score for the respective potentially malicious domain can include identifying other different domains associated with the IP address and determining an IP address risk score for the IP address based on VirusTotal enrichment data associated with the other different domains resolving to the same IP address. The data associated with the other different domains can include VirusTotal enrichment data. The other different domains associated with the IP address can include domains that resolve to the same IP address.

Identifying other different domains associated with the IP address can include selecting a subset of domains. In some implementations, the subset of domains can be selected randomly. By way of example, an IP address that a potentially malicious domain is registered to can have 1,000 additional other different domains associated with the respective IP address. The processing logic can select a random subset of the domains to be used to determine an IP address risk score for the IP address. In some implementations, identifying the other different domains associated with the IP address can include selecting a random subset of domains. The random subset of domains can include a pre-defined number of domains. In some implementations, identifying the other different domains associated with the IP address can include selecting a pre-defined number of domains associated with the IP address. In some implementations, the pre-defined number of domains can be selected based on a domain registration date. For instance, domains that have been registered more recently can be selected or their relative domain risk scores can be weighted differently than domains that were registered earlier. In some implementations the pre-defined number of domains can be 100 domains. The pre-defined number of domains can be any number of domains.

The data associated with the other different domains associated with the IP address can be obtained from a publicly available source. For instance, the IP address risk data or domain risk data can be obtained by generating a request for the data. In some implementations, an application programming interface (API), such as fraudulent domain risk value API 115, can be used to allow the domain monitoring component to pull the enriched data.

As described herein, the method can include enriching the data associated with the potentially malicious domain. The enriched data can include, or be used to determine, a risk score for each respective potentially malicious domain. This can include determining an IP address risk score for the IP address associated with the domain and determining a domain risk score for other domains associated with that same IP address.

The IP address risk score can include a number of different metrics. For instance, the metrics can include an indication of the number of unique websites associated with an IP address, a sum total of enriched data hits (e.g., virus hits), an enriched data hit ratio (e.g., virus hit ratio), or an enriched data risk and reputation. The sum total of enriched data hits can include a total number of viruses, malware, or other security instances associated with a respective IP address.

The enriched data hit ratio can be determined by taking a subset of domains associated with the IP address and determining a total number of security hits associated with the subset of domains. Security hits can include viruses, malware, or other security instances. An average number of hits can be determined by taking the total number of security hits associated with the subset of domains divided by the number of the subset of domains.

For instance, determining a risk score for the respective potentially malicious domain can include determining an IP address risk score for the IP address based on data associated with the other different domains associated with the IP address.

As described herein, determining the IP address risk score for the IP address based on data associated with the other different domains associated with the IP address can include obtaining a domain risk score for each respective domain of the other different domains associated with the IP address. The IP address risk score for the IP address can be determined based on the domain risk score for each respective domain of the other different domains.

For instance, determining the IP address risk score for the IP address based on data associated with the other different domains associated with the IP address can include summing the obtained domain risk scores for each respective domain of the other different domains.

Additionally, or alternatively, determining the IP address risk score for the IP address based on data associated with the other different domains associated with the IP address can include generating a weighted average of the domain risk scores for each respective domain of the other different domains associated with the IP address. In some instances, determining the IP address risk score for the IP address based on data associated with the other different domains associated with the IP address can include utilizing data for only a subset of the other different domains associated with the IP address. By way of example, generating the weighted average of the domain risk scores for each respective domain of the other different domains can include weighting more recently registered domain risk scores more heavily than earlier registered domain risk scores.

For example, in some implementations, an assumption can be made that more recently registered domain risk levels are a better indicator of risk than older registered domains associated with the same IP address. For instance, some IP addresses can be generally associated with malicious or fraudulent domains. In some cases, the IP addresses can begin with being associated with valid, malware free domains, but overtime become generally associated with higher risk domains. Weighting the domain risk scores of the respective domains based on when the domains were registered temporally can allow for more personalized assessments of domain risk scores of the IP address as a whole.

This weighting can also allow for detection of trends in the types of domains being registered to IP addresses.

The IP address risk score for the IP address can be based on enrichment data. The enrichment data can include, for example, WHOIS Information, domain "safety score," web reputation verdict, adult content score, domain categorization, domain/host prior malware association, resolved URLs to IP addresses, IP address data, or resolved domain data. The WHOIS information can include details relating to the domain such as a category, a time stamp, name and contact information for a registrant and registrar, registration dates, name servers, most recent update, and expiration date. The WHOIS records can also provide administrative and technical information such as detected downloaded or referrer samples, subdomains, resolutions, domain siblings, undetected URLs, or other information. A domain "safety score" can be a safety score determined for a respective domain. A web reputation verdict can include a determination of the likelihood that a URL contains URL-based malware. An adult content score can include a likelihood that a URL contains adult content. Domain categorization can include commercial businesses (e.g., ".com", ".biz"), organizations (e.g., nonprofit organizations, ".org"), government agencies (e.g., ".gov"), educational institutions (e.g., ".edu"), network organizations (e.g., ".net"), military (e.g., ".mil"), personalized domains (e.g., for blogs, resumes, social network, call-to-action, or other personal pages, ".me"), verified licensed professional (e.g., ".pro"), or informational (e.g., ".info").

Domain or host prior malware association can include an indication of whether the domain or host has been previously associated with hosting malware "at some point in time." Resolved URLS to IP addresses can include URLs that resolve to actual web pages or other content. IP address data can include country, autonomous number system (ASN), and IP owner, or a number of virus hits by the respective IP address. Resolved domain data can include an associated IP address and the IP address's data as well as a number of virus hits by the respective resolved domain.

At operation 210, processing logic can determine a potentially malicious domain is a malicious domain based on the IP address risk score of the potentially malicious domain. For instance, determining the potentially malicious domain is a malicious domain can be performed by comparing the risk score of the potentially malicious domain to a threshold risk score associated with previously determined malicious or fraudulent domains. By way of example, determining the potentially malicious domain is a malicious domain can be based on the IP address risk score of the first potentially malicious domain satisfying a criterion related to a threshold IP address risk score. For instance, determining the potentially malicious domain is a malicious domain can be based on the risk score of the potentially malicious domain exceeding a threshold risk score.

The processing logic can make a determination as to whether newly identified domain(s) are likely to be malicious, harmless, or some risk level in between. This determination can help reduce bandwidth utilization by preventing the initiation of unwarranted domain takedown actions or providing notifications about new domains that are ultimately determined to be harmless. This can allow for more efficient utilization of computing resources including reduction in processing and bandwidth utilization.

In some implementations, the IP address risk score of the potentially malicious domain can indicate that the potentially malicious domain is a malicious domain. Responsive to determining the domain is malicious, the processing logic can initiate a takedown action or notification action. Additionally, or alternatively, the processing logic can automatically initiate a domain takedown action in response to determining that the potentially malicious domain is a malicious domain.

Figure 4:
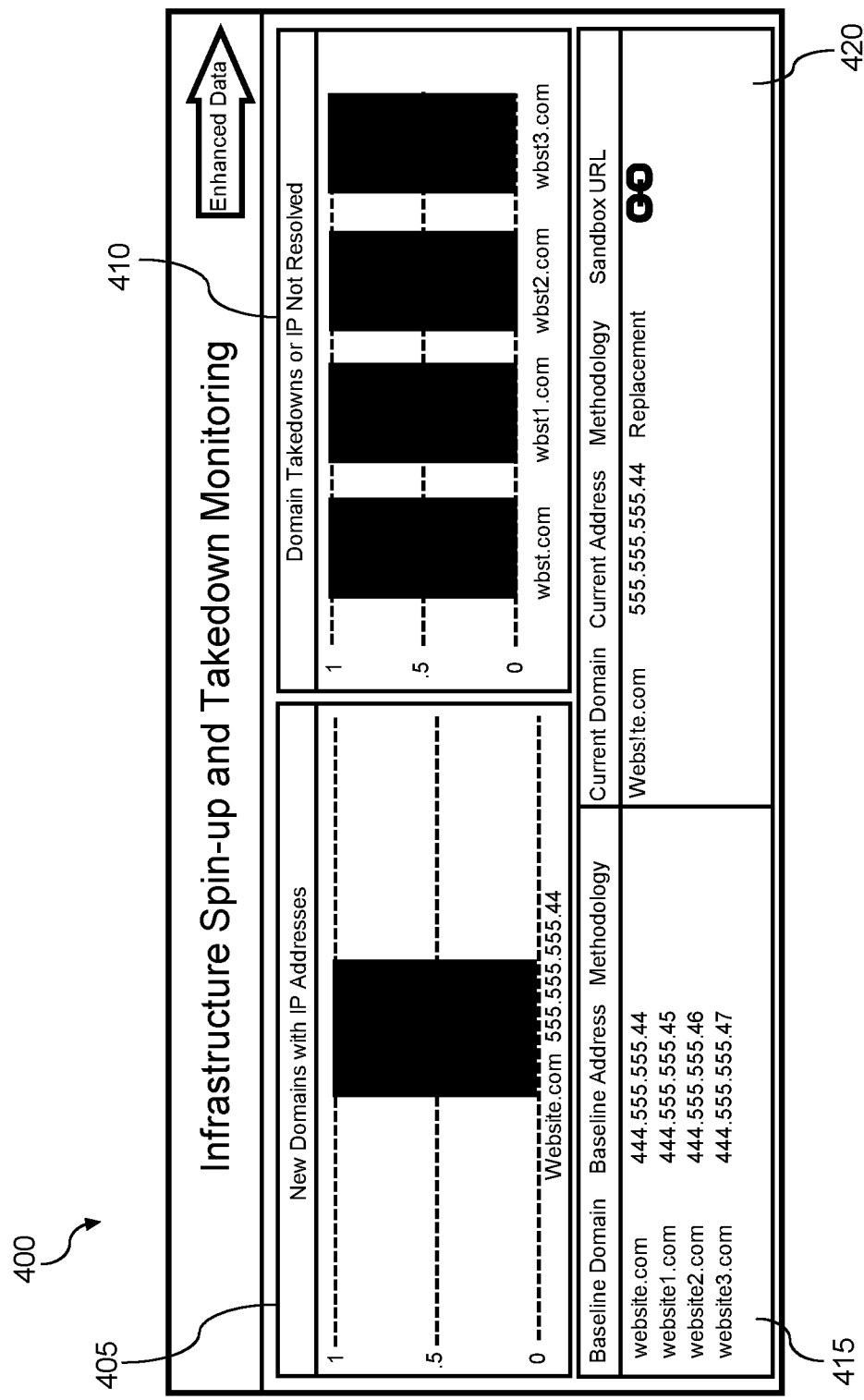
FIG. 4 depicts an example graphical user interface for depicting new domain registrations and domain takedowns according to embodiments of the present disclosure.
Figure 5:
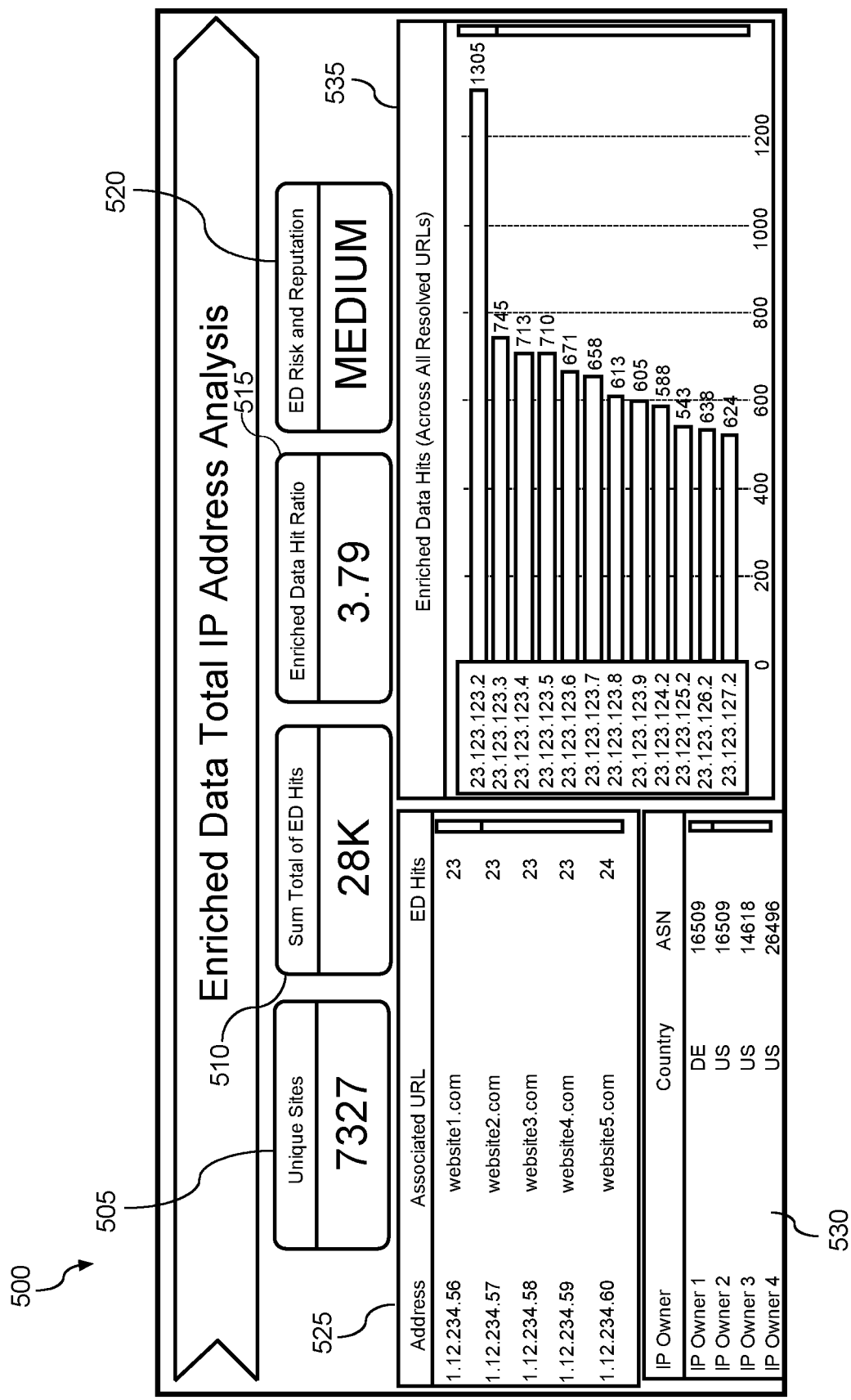
FIG. 5 depicts an example graphical user interface for depicting IP address risk scores according to embodiments of the present disclosure.

A domain takedown action can include automatically performing an action to remove malicious domains from the internet. The actions can include generating reports, automatically filing reports, or generating messages to provide for display via a user interface. The message can, for example, provide an indication that a takedown request or report has been filed. Additionally, or alternatively, the message can include an indication about a risk level of the potential malicious domain. In some instances, the domain takedown action can include providing a notification via a graphical user interface associated with monitoring domains. The notifications can include messages or updating various fields of the graphical user interface with data about a number of unique sites, a sum total of virus hits, a virus hit ratio, or an overall risk and reputation indication. Example graphical user interfaces are depicted in FIG. 3 to FIG. 5.

Figure 3:
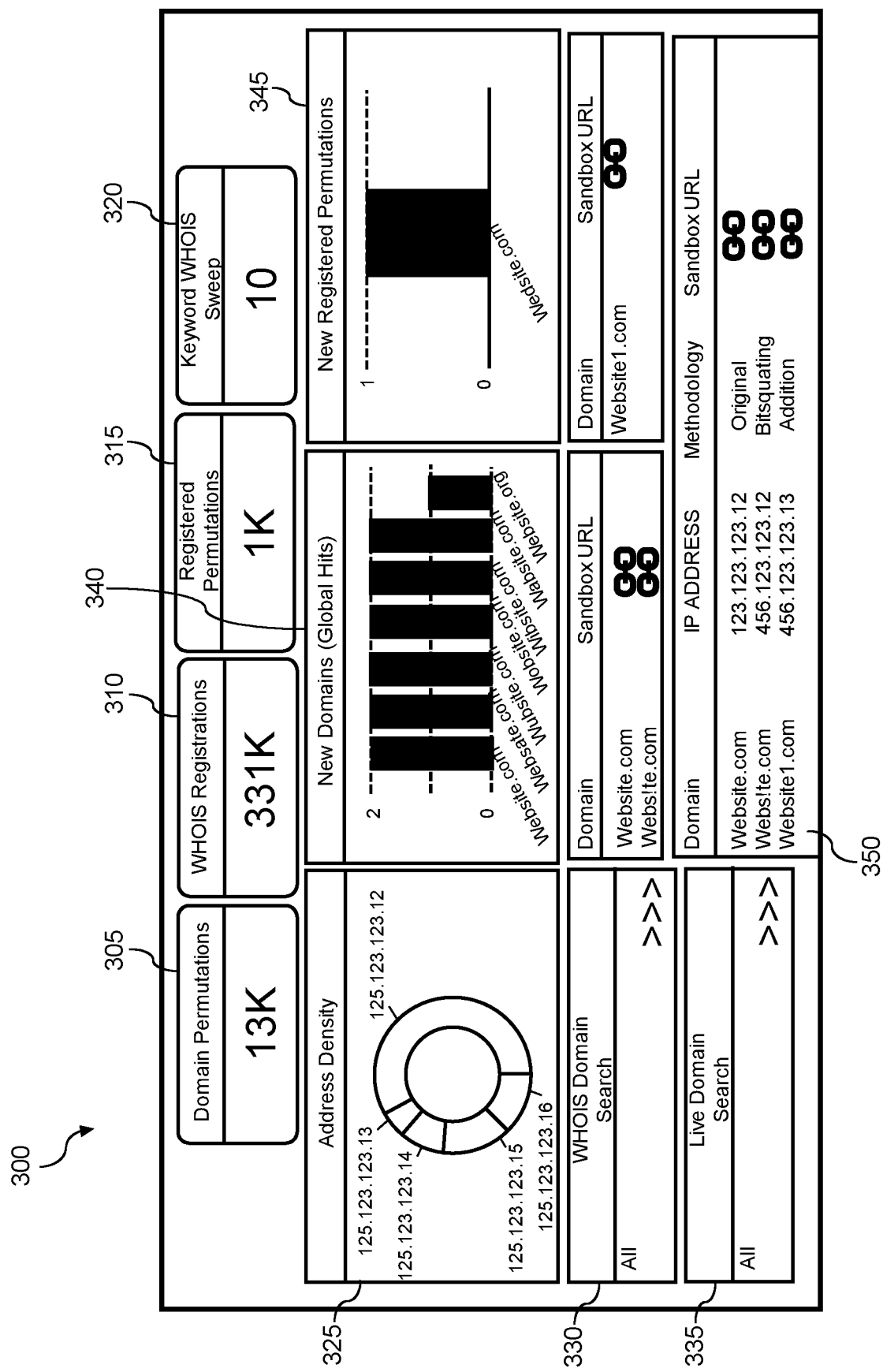
FIG. 3 depicts an example graphical user interface for a domain monitoring dashboard according to embodiments of the present disclosure.

FIG. 3 depicts an example graphical user interface 300 for displaying information relating to malicious domain monitoring and filtering. Graphical user interface 300 can provide for display a number of useful metrics relating to surfacing potentially malicious domains and related IP address and risk profiles. For instance, graphical user interface 300 can include a display of a number of different measurements including domain permutations 305, WHOIS registrations 310, registered permutations 315, and keyword WHOIS sweeps 320. Additionally, or alternatively, graphical user interface 300 can include address density 325, WHOIS domain search 330, live domain search 335, new domains chart 340, new registered permutations chart 345, and domain table 350.

Domain permutations 305 can include a numeric indication of the number of domain permutations that have been generated based on the domain being monitored. For instance, a permutation engine can obtain a domain that is to be monitored. The permutation engine can generate numerous permutations of the domain to be monitored. In some implementations, the permutations generated can be on the order of thousands of permutations. Permutations can include, for example, character omissions or additions, homoglyphs (e.g., substituting "o" for "0"), transpositions (e.g., "webstie.com" instead of "website.com"), replacements (e.g., "webs!te.com"), subdomains (e.g., "web.site.com"), hyphenations (e.g., "web-site.com"), bit squatting (e.g., bit flip domain name system (DNS) request), insertions (e.g., "webbsite.com"), vowel swapping (e.g., "webseti.com"), or a combination of the described techniques. The examples of permutations are included for illustrative purposes only and are not meant to be limiting. WHOIS registrations 310 can include a number of active WHOIS registrations. WHOIS is a public database that includes information obtained when a domain is registered, or the DNS settings associated with the domain are updated. Registered permutations 315 can include a number of permutations that are actively registered from the domains obtained from the WHOIS registrations 310.

Keyword WHOIS sweep 320 includes a number of keywords that have been obtained relating to the domain that is being monitored.

Oftentimes, IP addresses associated with one malicious domain have additional malicious domains that are registered to the respective IP address. The address density 325 can include a graphical depiction of the percentage of domains that are registered to the IP addresses. The address density 325 can include a graphical depiction of the percentage of domains that are registered to a common IP address. For instance an IP address can be associated with a majority of the registered domains. Additionally, or alternatively, IP addresses can have a more even distribution of registered domain permutations.

WHOIS domain search 330 can allow for a search of the group of WHOIS registrations. In some instances the group of WHOIS registrations can include a listing of WHOIS registrations. The group of WHOIS registrations can include a data structure representing the WHOIS registrations or associated data. Live domain search 335 can allow for a search of live domains. For instance, the WHOIS domain search 330 and live domain search 335 can include a selectable component that can be selected by a user to launch a search interface.

New domains chart 340 can include a graphical depiction of new domains compared to a baseline set. The new domains can include a number of new domains. New domains chart 340 can additionally include a table including the domains and links to sandbox URLs. Upon selection of a sandbox URL, the website associated with the URL can be provided for display in a sandboxed environment to allow for a user to review the website for security threats or suspicious content without risk of system vulnerability outside of the sandboxed environment. For purposes of this disclosure a sandboxed environment is meant to include an isolated virtual space in which potentially unsafe software code can execute without affecting the network resources, local system, or local applications.

New registered permutations chart 345 can include a graphical depiction of new registered permutations. For instance, the registered permutations can be compared to a baseline set of registered permutations to determine if any permutations have been newly registered since the baseline set was generated. The baseline set will be discussed in more detail with regard to FIG. 4. Newly registered permutations chart 345 can additionally include a table including the domains and links to sandbox URLs. Upon selection of a sandbox URL, the website associated with the URL can be provided for display in a sandboxed environment to allow for a user to review the website for security threats or suspicious content.

Domain table 350 can include a group of domains and associated data. The associated data can include the IP address, methodology used for generating the permutation, and a link to a sandbox URL. Methodology can include any of the permutation terminology as discussed with regard to domain permutations 305.

FIG. 4 depicts an example graphical user interface 400 depicting example visual representations of infrastructure spin-up and takedown monitoring according to example embodiments of the present disclosure. For instance, graphical user interface 400 can include new domains chart 405, domain takedowns chart 410, domain baseline set 415, and dynamic set 420.

As described herein, graphical user interface 400 can include a new domains chart 405. New domains chart 405 can include a graphical depiction of the number of new domains with registered IP addresses that have been detected by the domain monitoring system described herein. Graphical user interface 400 can include a domain takedowns chart 410 which can include a graphical depiction of the number of domain takedowns or IP addresses not resolved that have been detected by the domain monitoring system described herein.

The new domains chart 405 and domain takedowns chart 410 can be generated based on a comparison of the dynamic set 420 and the baseline set 415. For instance, upon onboarding of a domain, a baseline set 415 can be generated that includes known registered or unregistered domains. Periodically, the domain monitoring system can generate a dynamic set 420 with updated data. Upon user selection of a specific domain of interest, the computing system can determine whether the domain of interest is a new domain with IP address or is associated with a domain takedown or IP address not resolved.

For instance, as depicted herein, a new domain with IP address can be determined by comparing the baseline set which does not have data associated with "webs!te.com" registered to IP address "555.555.555.44". As such, the monitoring system can determine that the new domain is a potentially malicious domain. As discussed herein, the data associated with the potentially malicious domain can be enriched by existing domain and IP address reputation data. The enrichment data will be discussed further with regard to FIG. 5.

Both baseline set 415 and dynamic set 420 can depict data associated with domains. For instance, the data can include a domain, a current IP address, and a methodology. The domain can be a permutation of a domain that has been registered or otherwise submitted for monitoring. The baseline address can include the IP address that is associated with the respective domain. In some instances, a domain can exist but not be initially registered to an IP address. The methodology can include an indication of how the permutation or domain was generated or selected for use in baseline set 415.

Dynamic set 420 can additionally include a sandbox URL for each respective new domain that has been detected or domain that has been taken down or IP no longer resolves. For instance, the dynamic set 420 can be generated periodically. The dynamic set 420 can be generated on a regular or irregular recurring basis. In some implementations, a dynamic set 420 can be generated every hour, multiple times a day, once a day, once a week, or any other interval.

Comparing the baseline set 415 with the dynamic set 420, can be used to determine if a new domain has been registered or if an existing domain has been registered to a new or different IP address. Additionally, or alternatively, comparing the baseline set 415 with the dynamic set 420 can be used to determine if a domain has been taken down or if the domain no longer resolves. For instance, if a domain was flagged as potentially malicious and a takedown procedure occurred, then upon the next generation of dynamic set 420, the data in the table should indicate that the taken down malicious domain was, in fact, taken down.

By way of example, the baseline set 415 can include "wbsite.com", "websitel.com", "w3bsit3.com", and "wobsite.com". For exemplary purposes, the respective domains resolved, at the time of generation of the baseline set, to a baseline IP address "444.555.555.44". As depicted in FIG. 4, the dynamic set 420, which represents the domains and IP addresses from the most recent WHOIS domain registration scan, does not contain the domains. Thus, the domains are no longer resolvable and can be considered "domain takedowns" or "IP not resolved".

FIG. 5 depicts an example graphical user interface 500 for displaying an interactive enriched data IP address analysis interface. The interactive enriched data IP address analysis interface can display data relating to various IP addresses, registered domains, or total viruses associated with various IP addresses. For instance, graphical user interface 500 can include display of numbers of unique sites 505, sum total of enriched data hits 510, enriched data hit ratio 515, or enriched data risk and reputation 520. Unique sites 505 can include a number of unique websites or domains associated with an IP address of interest. For instance, an IP address of interest can include an IP address associated with a newly registered domain that is determined to be potentially malicious. Sum total of enriched data hits 510 can include a sum total of viruses or other security risks associated with the respective IP address. Enriched data hit ratio 515 can include a ratio of the number of enriched data hits divided by a total number of domains. Enriched data risk and reputation 520 can include a semantic indication of a risk and reputation level of the IP address. The semantic indication of risk and reputation level can include, for example, low risk, medium risk, or high risk. For instance, as depicted in FIG. 5, the IP address can have a medium risk and reputation level. Determination of the enriched data risk ratio 515 and enriched data risk and reputation 520 has been discussed in greater detail with regard to FIG. 2.

Graphical user interface 500 can include an IP address table 525, an IP address owner table 530, or an enriched data chart 535. IP address table 525 can include data associated with IP addresses. For instance, the data can include associated URLs and enriched data hits. The hits can be a number of security issues that are associated with each respective group of an IP address and assorted URLs.

IP address owner table 530 can include data associated with IP owners. For instance, the data can include a group of the IP owner, a country associated with the IP owner, and the IP owner's ASN. ASN can include an autonomous number system identifier. The ASN can be a unique control routing with a network. Generally, IPs associated with a particular organization, network operator, or domain with the same external routing policy will have the same ASN.

Enriched data chart 535 can include a number of security concerns associated with various IP addresses. For instance, enriched data chart 535 can include data associated with an IP address across all resolved URLs. Thus, the number of security hits or the IP address risk score associated with the respective IP address can be determined based not only on the potentially malicious domain, but rather based on the context data associated with the security level of the IP address associated with the potentially malicious domain. Thus, an IP address that has a large number of fraudulent or malicious domains registered to the IP address will have a larger number of security instances represented in the enriched data chart 535.

Figure 6:
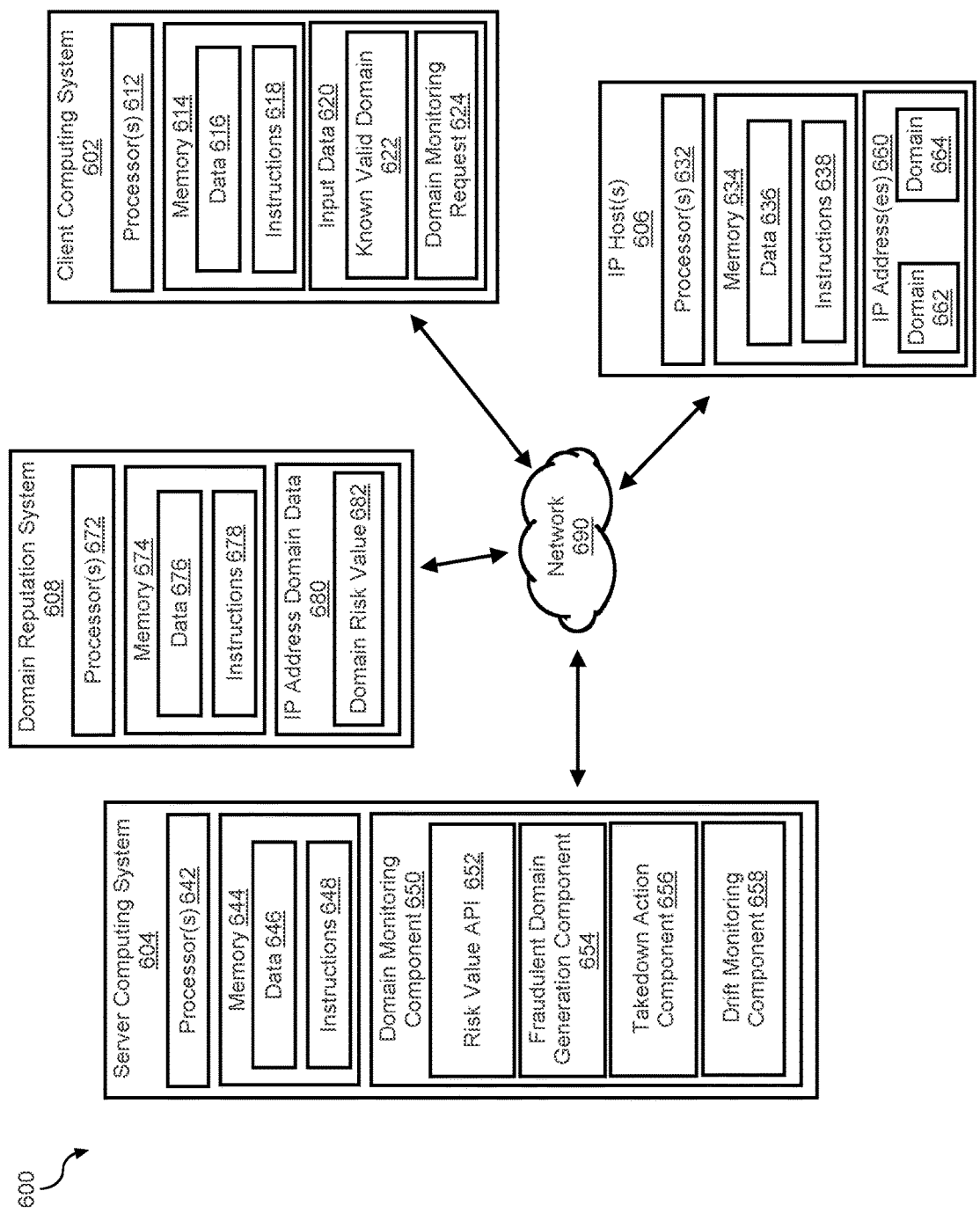
FIG. 6 depicts an example block diagram for malicious domain monitoring and filtering using drift monitoring and contextual data.

FIG. 6 depicts a block diagram of an example computing system 600 that monitors malicious domains and determines privacy execution actions based on context data associated with a user device according to example embodiments of the present disclosure. The computing system 600 includes a client computing system 602, a server computing system 604, IP Host(s) 606, and domain reputation system 608 that are communicatively coupled over a network 690.

The client computing system 602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing system 602 includes processors 612 and memory 614. The processors 612 can be any suitable processing device (e.g., a processor core, a microprocessor, an ASIC, an FPGA, a controller, a microcontroller, etc.) and can be one processor or a plurality of processors that are operatively connected. The memory 614 can include non-transitory computer-readable storage media, such as RAM, ROM, EEPROM, EPROM, flash memory devices, magnetic disks, etc., and combinations thereof. The memory 614 can store data 616 and instructions 618 which are executed by the processor 612 to cause the client computing system 602 to perform operations.

In some implementations, the client computing system 602 can include input data 620. Input data 620 can include known valid domain 622 or domain monitoring request 624. Known valid domain 622 can include a valid domain that can be obtained by the computing system based on user provided input of a known valid domain. Domain monitoring request 624 can include data associated with a request to monitor a domain. For instance, the domain monitoring request 624 can include a domain, permutations associated with the domain, or instructions to perform monitoring operations associated with the domain.

The input data 620 can be received via user input provided to a user interface or input component of client computing system 602. For example, the input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 604 includes processors 642 and a memory 644. The processors 642 can be any suitable processing device (e.g., a processor core, a microprocessor, an ASIC, an FPGA, a controller, a microcontroller, etc.) and can be one processor or a plurality of processors that are operatively connected. The memory 644 can include non-transitory computer-readable storage media, such as RAM, ROM, EEPROM, EPROM, flash memory devices, magnetic disks, etc., and combinations thereof. The memory 644 can store data 646 and instructions 648 which are executed by the processor 642 to cause the server computing system 604 to perform operations.

In some implementations, the server computing system 604 includes or is otherwise implemented by server computing devices. In instances in which the server computing system 604 includes plural server computing devices, such server computing devices can operate according to sequential computing architectures, parallel computing architectures, or some combination thereof.

Server computing system 604 can include domain monitoring component 650. Domain monitoring component 650 can include risk value API 652, fraudulent domain generation component 654, takedown action component 656, or drift monitoring component 658. As described herein, risk value API 652 can include an application programming interface capable of obtaining data associated with a domain monitoring request and generating a request for risk value data associated with flagged potential malicious domains. Fraudulent domain generation component 654 can determine fraudulent domains. Takedown action component 656 can determine and act upon a takedown action associated with removing a malicious domain. Drift monitoring component 658 can be configured to generate a baseline set and dynamic sets to determine newly registered domains as well as takedowns of domains.

The IP Host(s) 606 includes processors 632 and memory 634. The processors 632 can be any suitable processing device (e.g., a processor core, a microprocessor, an ASIC, an FPGA, a controller, a microcontroller, etc.) and can be one processor or a plurality of processors that are operatively connected. The memory 634 can include non-transitory computer-readable storage media, such as RAM, ROM, EEPROM, EPROM, flash memory devices, magnetic disks, etc., and combinations thereof. The memory 634 can store data 636 and instructions 638 which are executed by the processor 632 to cause the client computing system 602 to perform operations.

In some implementations, the IP Host(s) 606 can include IP address(es) 660. IP address(es) 660 can include domains 662, 664. Domains 662, 664 can be domains that are associated with, or registered to, the respective IP address(es) 660.

The domain reputation system 608 includes processors 672 and memory 674. The processors 672 can be any suitable processing device (e.g., a processor core, a microprocessor, an ASIC, an FPGA, a controller, a microcontroller, etc.) and can be one processor or a plurality of processors that are operatively connected. The memory 674 can include non-transitory computer-readable storage media, such as RAM, ROM, EEPROM, EPROM, flash memory devices, magnetic disks, etc., and combinations thereof. The memory 674 can store data 676 and instructions 678 which are executed by the processor 672 to cause the domain reputation system to perform operations.

In some implementations, the domain reputation system 608 can include IP address domain data 680. IP address domain data 680 can include domain risk values 682. Domain risk values 682 can include risk data associated with a number of domains associated with a number of IP addresses. For instance, the risk data can include a number of takedown requests submitted to an IP address relating to domains registered to that address, data associated with fraudulent or malicious content on a website associated with the domains, or any other security risk related data.

In some implementations, the client computing system 602, server computing system 604, IP Host(s) 606, or domain reputation system 608 can store or include one or more models. For example, the models can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more models can be received by the server computing system 604 over the network 690, stored in the memory of a respective computing system (e.g., memory 614, 634, 644, 674), and then used or otherwise implemented by one or more processors of the respective computing systems (e.g., processors 612, 632, 642, 672). In some implementations, the respective computing systems can implement multiple parallel instances of a single model.

More particularly, models can be used to automate steps of logic processing discussed in FIG. 2. For instance, machine learning models can be used to improve malicious domain monitoring, generating requests for domain monitoring, improved determination of risk scores for domains and IP addresses, performing take down actions, or any other functions.

Additionally, or alternatively, one or more models can be included in or otherwise stored and implemented by the server computing system 604 that communicates with the client computing system 602 according to a client-server relationship. For example, the models can be implemented by the server computing system 604 as a portion of a web service (e.g., a domain monitoring service, a security operations center service, a cybersecurity service). Thus, one or more models can be stored and implemented at the client computing system 602 or one or more models can be stored and implemented at the server computing system 604.

The client computing system 602, server computing system 604, IP host(s) 606, or domain reputation system 608 can train the models via interaction with a training computing system (not pictured) that is communicatively coupled over the network 690. The training computing system can be separate from the server computing system 604 or can be a portion of the server computing system 604.

The training computing system includes one or more processors and a memory. The one or more processors can be any suitable processing device (e.g., a processor core, a microprocessor, an ASIC, an FPGA, a controller, a microcontroller, etc.) and can be one processor or a plurality of processors that are operatively connected. The memory can include one or more non-transitory computer-readable storage media, such as RAM, ROM, EEPROM, EPROM, flash memory devices, magnetic disks, etc., and combinations thereof. The memory can store data and instructions which are executed by the processor to cause the training computing system to perform operations. In some implementations, the training computing system includes or is otherwise implemented by one or more server computing devices.

The training computing system can include a model trainer that trains the machine-learned models stored at the client computing system 602, the server computing system 604, the IP Host(s) 606, or domain reputation system 608 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer can perform a number of generalization techniques (e.g., weight decays, dropouts, etc.) to improve the generalization capability of the models being trained.

In particular, the model trainer can train the models based on a set of training data. Training data can include, previously taken down malicious domain, historically determined risk scores, historically determined malicious domains, historically determined IP address risk scores, or other related training data.

In some implementations, if the user has provided consent, the training examples can be provided by the user computing device. Thus, in such implementations, the model provided to the client computing system 602 can be trained by the training computing system on user-specific data received from the client computing system 602. In some instances, this process can be referred to as personalizing the model.

The model trainer includes computer logic utilized to provide desired functionality. The model trainer can be implemented in hardware, firmware, and/or software controlling a general purpose processor. For example, in some implementations, the model trainer includes program files stored on a storage device, loaded into a memory and executed by one or more processors. In other implementations, the model trainer includes one or more sets of computer-executable instructions that are stored in a tangible computer-readable storage medium such as RAM, hard disk, or optical or magnetic media.

The network 690 can be any type of communications network, such as a local area network (e.g., intranet), wide area network (e.g., Internet), or some combination thereof and can include any number of wired or wireless links. In general, communication over the network 690 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted or described steps are merely illustrative and can be omitted, combined, or performed in an order other than that depicted or described; the numbering of depicted steps is merely for ease of reference and does not imply any particular ordering is necessary or preferred.

The functions or steps described herein can be embodied in computer-usable data or computer-executable instructions, executed by one or more computers or other devices to perform one or more functions described herein. Generally, such data or instructions include routines, programs, objects, components, data structures, or the like that perform particular tasks or implement particular data types when executed by one or more processors in a computer or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined or distributed as desired. In addition, the functionality can be embodied in whole or in part in firmware or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions or computer-usable data described herein.

Although not required, one of ordinary skill in the art will appreciate that various aspects described herein can be embodied as a method, system, apparatus, or one or more computer-readable media storing computer-executable instructions. Accordingly, aspects can take the form of an entirely hardware embodiment, an entirely software embodiment, an entirely firmware embodiment, or an embodiment combining software, hardware, or firmware aspects in any combination.

As described herein, the various methods and acts can be operative across one or more computing devices or networks. The functionality can be distributed in any manner or can be located in a single computing device (e.g., server, client computer, user device, or the like).

Aspects of the disclosure have been described in terms of illustrative embodiments thereof. Numerous other embodiments, modifications, or variations within the scope and spirit of the appended claims can occur to persons of ordinary skill in the art from a review of this disclosure. For example, one or ordinary skill in the art can appreciate that the steps depicted or described can be performed in other than the recited order or that one or more illustrated steps can be optional or combined. Any and all features in the following claims can be combined or rearranged in any way possible.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, or equivalents to such embodiments. Accordingly, the subject disclosure does not preclude inclusion of such modifications, variations, or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, or equivalents.

What is claimed is:

1. A computer-implemented method, comprising:
generating a baseline set of domains by comparing a plurality of domains of interest to a group of existing registered domains, wherein the domains of interest are generated using a permutation engine based on a first domain;
periodically generating a dynamic set of domains by comparing the plurality of domains of interest to an updated group of existing registered domains, wherein the updated group of existing registered domains is obtained in real-time;
determining at least one potentially malicious domain based on comparing the baseline set and dynamic set;
for each respective potentially malicious domain:
obtaining an internet protocol (IP) address associated with the potentially malicious domain;
determining a risk score for the respective potentially malicious domain by:
identifying one or more other different domains associated with the IP address by selecting a pre-defined number of domains associated with the IP address based on a domain registration date; and
determining an IP address risk score for the IP address based on data associated with the one or more other different domains associated with the IP address; and
determining a first potentially malicious domain is a malicious domain based on the risk score of the first potentially malicious domain.

2. The computer-implemented method of claim 1, comprising:
automatically initiating a domain takedown action in response to determining the first potentially malicious domain is a malicious domain.

3. The computer-implemented method of claim 1, wherein identifying the one or more other different domains associated with the IP address comprises selecting a random subset of domains.

4. The computer-implemented method of claim 1, wherein identifying the one or more other different domains associated with the IP address comprises selecting a random subset of domains, wherein the random subset of domains comprises a pre-defined number of domains.

5. The computer-implemented method of claim 1, wherein determining the first potentially malicious domain is a malicious domain is based on the risk score of the first potentially malicious domain satisfying a criterion related to a threshold risk score.

6. The computer-implemented method of claim 1, wherein determining the IP address risk score for the IP address based on data associated with the one or more other different domains associated with the IP address comprises:
obtaining a domain risk score for each respective domain of the one or more other different domains associated with the IP address; and
summing the obtained domain risk scores for each respective domain of the one or more other different domains.

7. The computer-implemented method of claim 1, wherein determining the IP address risk score for the IP address based on data associated with the one or more other different domains associated with the IP address comprises:
obtaining a domain risk score for each respective domain of the one or more other different domains associated with the IP address; and
generating a weighted average of the domain risk scores for each respective domain of the one or more other different domains associated with the IP address.

8. The computer-implemented method of claim 7, wherein generating the weighted average of the domain risk scores for each respective domain of the one or more other different domains, comprises weighting more recently registered domain risk scores more heavily than earlier registered domain risk scores.

9. A computing system, comprising:
one or more processors; and
one or more computer-readable media storing instructions that are executable to cause the one or more processors to perform operations, the operations comprising:
obtaining a first domain;
generating, using a permutation engine, a plurality of domains of interests;
generating a baseline set of domains by comparing the plurality of domains of interest to a group of registered domains, wherein the baseline set comprises at least a domain and an internet protocol (IP) address;
periodically, generating a dynamic set of domains by comparing the plurality of domains of interest to an updated group of existing registered domains, wherein the updated group of existing registered domains is obtained in real-time;
comparing, in response to generating the dynamic set of domains, the dynamic set to the baseline set to determine changes to at least one of the group of domains or an IP address for a domain being updated;
detecting, based on the comparison of the baseline set and the dynamic set, creation or deletion of one or more potentially malicious domains;
for each respective potentially malicious domain:
obtaining the IP address associated with the potentially malicious domain;
determining a risk score for the respective potentially malicious domain by:
identifying one or more other different domains associated with the IP address; and
determining an IP address risk score for the IP address based on data associated with the one or more other different domains associated with the IP address by:
obtaining a domain risk score for each respective domain of the one or more other different domains associated with the IP address; and
generating a weighted average of the domain risk scores for each respective domain of the one or more other different domains associated with the IP address; and
determining a potentially malicious domain is a malicious domain based on the risk score.

10. The computing system of claim 9, wherein generating the dynamic set of domains occurs multiple times a day.

11. The computing system of claim 9, wherein determining the IP address risk score for the IP address based on data associated with the one or more other different domains associated with the IP address comprises:
obtaining a domain risk score for each respective domain of the one or more other different domains associated with the IP address; and
generating a weighted average of the domain risk scores for each respective domain of the one or more other different domains associated with the IP address.

12. The computing system of claim 11, wherein generating the weighted average of the domain risk scores for each respective domain of the one or more other different domains, comprises weighting more recently registered domain risk scores more heavily than earlier registered domain risk scores.

13. The computing system of claim 9, wherein identifying one or more other different domains associated with the IP address comprises selecting a random subset of domains, wherein the random subset of domains comprises a pre-defined number of domains.

14. The computing system of claim 9, wherein identifying one or more other different domains associated with the IP address comprises selecting a pre-defined number of domains.

15. The computing system of claim 14, wherein the pre-defined number of domains are selected based on a domain registration date.

16. The computing system of claim 9, comprising:
   automatically initiating a domain takedown action in response to determining the potentially malicious domain is a malicious domain.

17. One or more non-transitory computer readable media storing instructions that are executable by one or more processors to perform operations comprising:
   generating a baseline set of domains by comparing a plurality of domains of interest to a group of existing registered domains, wherein the domains of interest are generated using a permutation engine based on a first domain;
   periodically generating a dynamic set of domains by comparing the plurality of domains of interest to an updated group of existing registered domains, wherein the updated group of existing registered domains is obtained in real-time;
   determining at least one potentially malicious domain based on comparing the baseline set and dynamic set;
   for each respective potentially malicious domain:
      obtaining an IP address associated with the potentially malicious domain;
      determining a risk score for the respective potentially malicious domain by:
      identifying one or more other different domains associated with the IP address; and
      determining an IP address risk score for the IP address based on data associated with the one or more other different domains associated with the IP address by:
         obtaining a domain risk score for each respective domain of the one or more other different domains associated with the IP address; and
         generating a weighted average of the domain risk scores for each respective domain of the one or more other different domains associated with the IP address; and
   determining a first potentially malicious domain is a malicious domain based on the risk score of the first potentially malicious domain.

* * * * *